(12) United States Patent
Wu et al.

(10) Patent No.: US 10,375,576 B1
(45) Date of Patent: Aug. 6, 2019

(54) DETECTION OF MALWARE APPS THAT HIJACK APP USER INTERFACES

(71) Applicant: Trend Micro Incorporated, Tokyo (JP)

(72) Inventors: Longping Wu, Nanjing (CN); Liang Sun, Nanjing (CN); Chengyu Fang, Nanjing (CN)

(73) Assignee: TREND MICRO INCORPORATED, Tokyo (JP)

( * ) Notice: Subject to any disclaimer, the term of this patent is extended or adjusted under 35 U.S.C. 154(b) by 118 days.

(21) Appl. No.: 15/261,361

(22) Filed: Sep. 9, 2016

(51) Int. Cl.
*G06F 21/56* (2013.01)
*H04W 12/12* (2009.01)
*H04L 29/06* (2006.01)

(52) U.S. Cl.
CPC .......... *H04W 12/12* (2013.01); *G06F 21/567* (2013.01); *H04L 63/1416* (2013.01)

(58) Field of Classification Search
CPC ........ H04W 12/12; G06F 21/53; G06F 21/54; G06F 21/56; G06F 21/552; G06F 21/556; H04L 63/145; H04L 63/1416
See application file for complete search history.

(56) References Cited

U.S. PATENT DOCUMENTS

| | | | |
|---|---|---|---|
| 1,261,167 A | 4/1918 | Russell | |
| 8,756,432 B1 | 6/2014 | Chen | |
| 8,806,641 B1 | 8/2014 | Li | |
| 9,092,615 B1 | 7/2015 | Mao | |
| 9,313,219 B1 | 4/2016 | Zhang et al. | |
| 2004/0261021 A1 | 12/2004 | Mitta et al. | |
| 2006/0241933 A1 | 10/2006 | Franz | |
| 2009/0328216 A1* | 12/2009 | Rafalovich | H04L 43/0876 726/23 |
| 2012/0019674 A1 | 1/2012 | Ohnishi et al. | |
| 2012/0072991 A1 | 3/2012 | Belani et al. | |
| 2012/0214416 A1 | 8/2012 | Kent et al. | |
| 2013/0196649 A1* | 8/2013 | Paddon | H04M 1/66 455/423 |
| 2013/0281206 A1 | 10/2013 | Lyons et al. | |
| 2013/0281207 A1 | 10/2013 | Lyons et al. | |
| 2013/0291123 A1 | 10/2013 | Rajkumar et al. | |
| 2013/0307784 A1 | 11/2013 | Matsuzawa et al. | |

(Continued)

OTHER PUBLICATIONS

Soundex—Wikipedia, the free encyclopedia, 4 sheets [retrieved on Aug. 19, 2014], retrieved from the internet: http://en.wikipedia.org/wiki/Soundex.

(Continued)

*Primary Examiner* — Daniel B Potratz
*Assistant Examiner* — William B Jones
(74) *Attorney, Agent, or Firm* — Okamoto & Benedicto LLP

(57) ABSTRACT

A computer-implement method of detecting malware apps includes receiving a sample app for a mobile operating system. The sample app is executed in an emulator of the mobile operating system. The behavior of the sample app in the emulator is monitored to collect a string that the sample app uses to detect whether or not a target app is running in a foreground of the emulator. A bait app, which is generated using the collected string, is switched to run in the foreground. The sample app is deemed to be a malware app when the sample app instead of the bait app is running in the foreground.

14 Claims, 4 Drawing Sheets

(56) References Cited

U.S. PATENT DOCUMENTS

| | | |
|---|---|---|
| 2014/0006032 A1 | 1/2014 | Korn |
| 2014/0113683 A1 | 4/2014 | Hickey |
| 2014/0245448 A1 | 8/2014 | Moon et al. |
| 2014/0248929 A1 | 9/2014 | Noonan et al. |
| 2015/0220514 A1 | 8/2015 | Zhang |
| 2018/0025157 A1* | 1/2018 | Titonis .................... G06F 21/56 726/24 |

OTHER PUBLICATIONS

Edit distance—Wikipedia, the free encyclopedia, 5 sheets [retrieved on Aug. 19, 2014], retrieved from the internet: http://en.wikipedia.org/wiki/Edit_distance.

* cited by examiner

DETECTION OF MALWARE APPS THAT HIJACK APP USER INTERFACES

BACKGROUND OF THE INVENTION

1. Field of the Invention

The present invention relates generally to computer security, and more particularly but not exclusively to apps of mobile operating systems.

2. Description of the Background Art

Mobile computing devices run mobile operating systems, which are designed to be suitable for computers that are constrained in terms of memory and processor speed. An application program for a mobile operating system is commonly referred to as a "mobile app" or simply as an "app." The ANDROID operating system is an example of a mobile operating system. ANDROID apps are widely popular, being available not just from the official ANDROID app store but also from third parties. This makes ANDROID apps a prime target for cybercriminals.

A malware app, i.e., an app that comprises malicious code, can take over control of an app's user interface, thereby allowing the malware app to steal confidential information, to lock the mobile computing device for ransom, and to perpetrate other malicious actions. As a protection against malware detectors, some of these malware apps do not exhibit malicious behavior unless a particular target app is present and running in the mobile operating system. Because of the large number of available apps that may be targeted by the malware, detection of these malware apps is very difficult and involves tedious trial and error.

SUMMARY

In one embodiment, a computer-implement method of detecting malware apps includes receiving a sample app for a mobile operating system. The sample app is executed in an emulator of the mobile operating system. The behavior of the sample app in the emulator is monitored to collect a string that the sample app uses to detect whether or not a target app is running in a foreground of the emulator. A bait app, which is generated using the collected string, is switched to run in the foreground. The sample app is deemed to be a malware app when the sample app instead of the bait app is running in the foreground.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
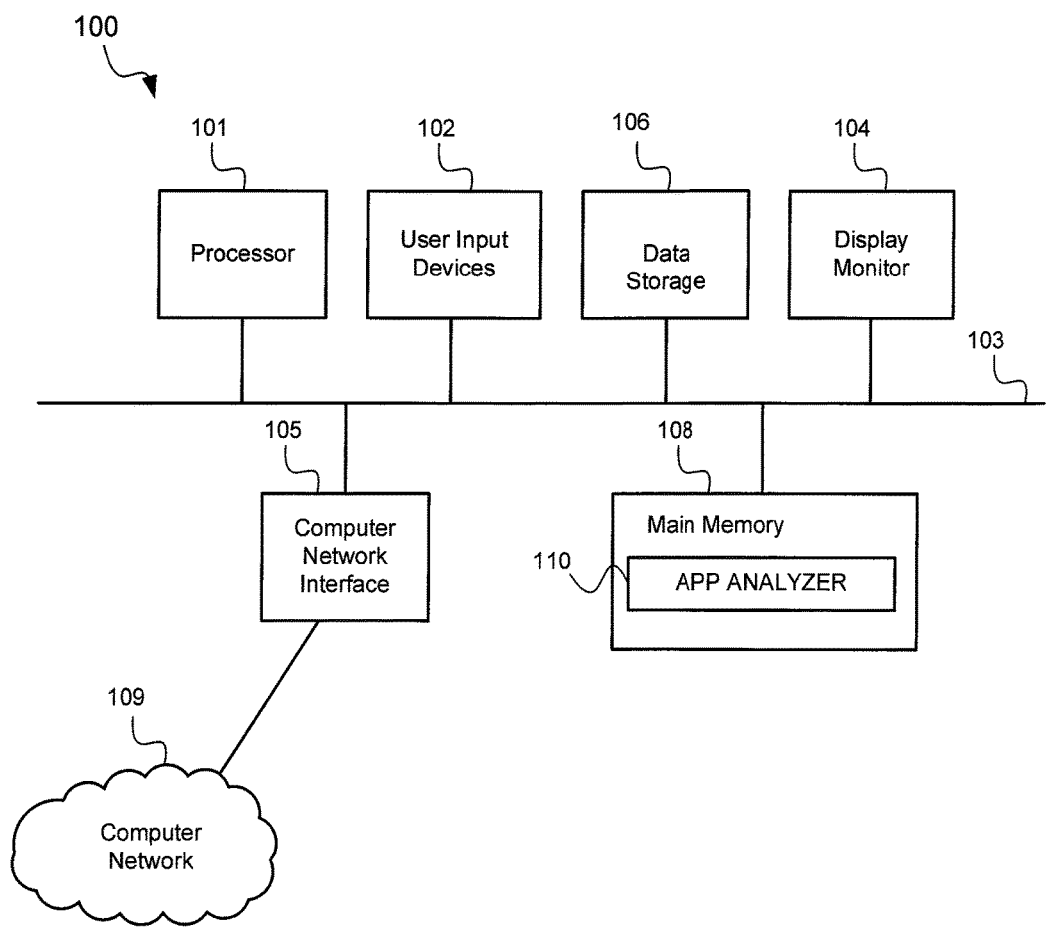
FIG. 1 shows a schematic diagram of a computer system for detecting malware apps in accordance with an embodiment of the present invention.

Referring now to FIG. 1, there is shown a schematic diagram of a computer system 100 for detecting malware apps in accordance with an embodiment of the present invention. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 causes the computer system 100 to be operable to perform the functions of the one or more software modules. In the example of FIG. 1, the software modules comprise an app analyzer 110, which comprises instructions that when executed by the processor 101 perform the steps of detecting malicious apps.

Figure 2:
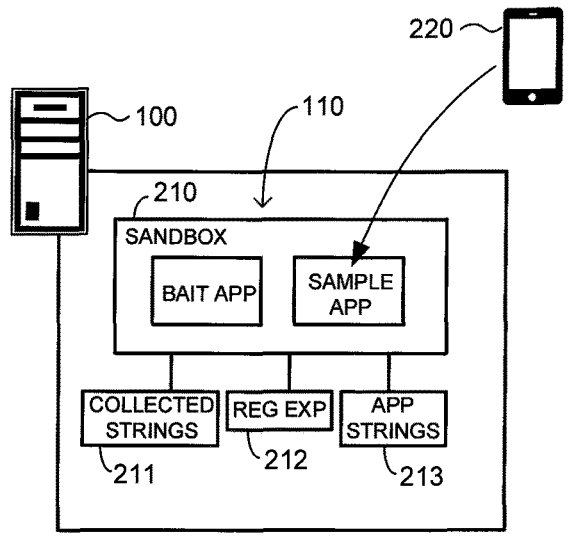
FIG. 2 shows an app analyzer of the computer system of FIG. 1 in accordance with an embodiment of the present invention.

FIG. 2 shows an app analyzer 110 of the computer system 100 in accordance with an embodiment of the present invention. In one embodiment, the app analyzer 110 is configured to monitor a behavior of a sample app, generate a bait app based on the monitored behavior of the sample app, and determine whether or not the sample app is a malware app based on the sample app's behavior with respect to the bait app. A sample app, i.e., app to be evaluated for malware, may be received from a mobile computing device 220 (e.g., smartphone, tablet) over the Internet or other computer network. The sample app may also be received from other sources. In one embodiment, the sample app is an ANDROID app.

The app analyzer 100 may comprise an emulator in the form of a sandbox module 210. The sandbox module 210 may be configured to provide an isolated and controlled execution environment in which to run a sample app for evaluation. In one embodiment, the sandbox module 210 comprises an ANDROID emulator that is based on program code from the Android Open Source Project (AOSP; <<https://source.android.com/>>). Application programming interface (API) and relevant source code of the ANDROID operating system may be suitably modified to monitor the foreground behavior of a sample app, including to detect whether the sample app is detecting which app is running in the foreground, and to receive string parameters employed by the sample app to determine the identity of the app that is currently running in the foreground. Strings that are employed by the sample app to make string comparisons may be collected by the sandbox module 210 and stored as collected strings 211.

The app strings 213 may comprise predetermined strings of identifiers of target apps, while the regular expressions 212 may comprise predetermined regular expressions that describe suspicious strings. A target app is an app that a malware app is configured to exploit. More specifically, the malware app is configured to hijack the user interface of the target app. In this example where the sample app is an ANDROID app, an app string 213 may comprise the activity name of a target ANDROID app. As particular example, an app string 213 may be "com.tencent.mm.ui.account.LoginUI, cmb.pb.ui.LoginActivity". The app strings 213 may be periodically updated to include the activity names, properties, and other characteristics of known apps that may be targeted by malware apps. A regular expression 212 may describe a suspicious activity name. For example, a regular expression 212 may describe a string that cybercriminals often use. An example regular expression 212 may be "^([a-zA-Z]+[.][a-zA-Z]+)[.]*.*".

Figure 3:
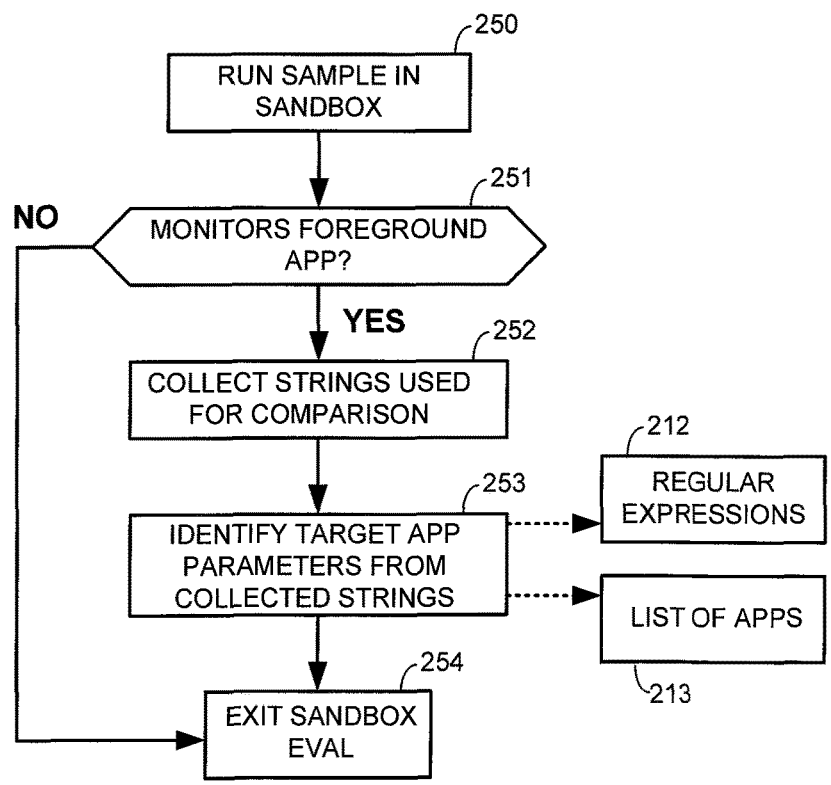
FIGS. 3 and 4 show flow diagrams of a computer-implemented method of detecting malware apps in accordance with an embodiment of the present invention.
Figure 4:
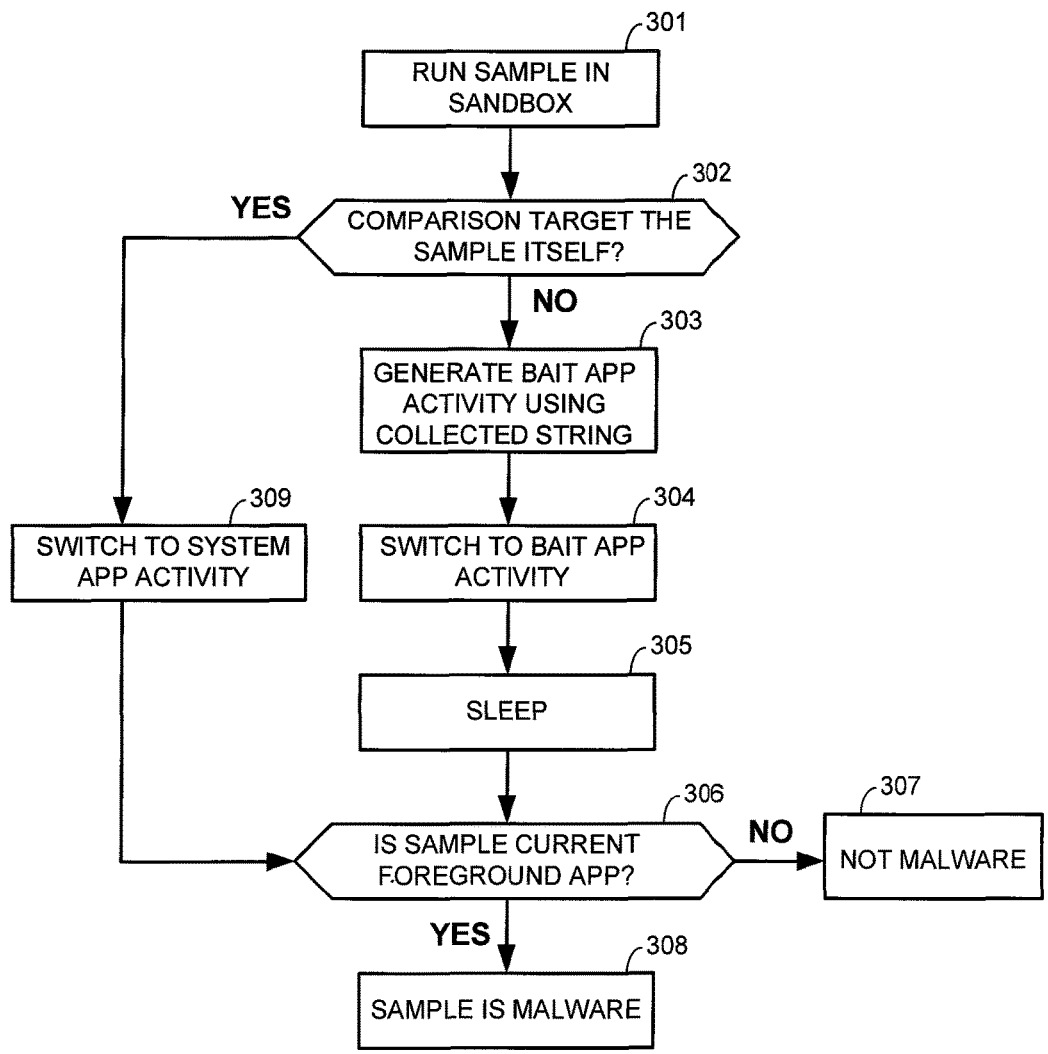

FIGS. 3 and 4 show flow diagrams of a computer-implemented method of detecting malware apps in accordance with an embodiment of the present invention. FIGS. 3 and 4 are explained with reference to the computer system 100 for illustration purposes only. In one embodiment, detection of a malware app is performed in two phases, with the first phase detecting whether or not the sample app exhibits behavior indicative of user interface (UI) hijacking and the second phase detecting whether or not the sample app actually performs UI hijacking.

UI hijacking is a cybercrime wherein a malware app takes control of the user interface of an app. An activity is a component of an ANDROID app that provides a user interface. An app that is running in the foreground has an activity that is currently active, i.e., ready to accept user input or to generate an output (e.g., display, sound). A malware app hijacks the activity of an app that is currently running in the foreground. Doing so, the malware app is able to receive and steal user inputs. Controlling the foreground activity also allows the malware app to lock the user from operating the mobile computing device unless the user pays; this enables the cybercriminal to extort money from the user in a so called "ransomware attack".

In the example of FIG. 3, the sample app is executed in the sandbox module 210 (step 250) to detect whether or not the sample app exhibits behavior indicative of UI hijacking. More specifically, the behavior of the sample app may be observed to determine if the sample app monitors the foreground app (step 251) to detect whether or not the target app is running in the foreground. For example, the sandbox module 210 may monitor the sample app to detect if the sample app is calling an API from the ANDROID software development kit (SDK) that returns the current foreground app's activity name. When the number of times the sample app calls the API to retrieve the foreground app's activity name exceeds a threshold, this indicates that the sample app is monitoring the foreground app. If the sample app is not monitoring the foreground app, the sample app is not deemed to exhibit UI hijacking behavior, in which case the sandbox evaluation is ended (step 251 to step 254).

When the sample app is deemed to be monitoring the foreground app, the sandbox module 210 collects string parameters that the sample app employs to make string comparisons to detect the name of the activity of the foreground app (step 251 to step 252). More specifically, a malware may be configured to hijack the activity of a target app, i.e., the particular app being targeted by the malware app. The malware app may detect the presence of the target app in the foreground by retrieving the name of the activity of the foreground app for comparison against the name of the activity of the target app. Activity names are in string format, so the activity name comparison to detect the foreground app involves string comparisons. The sandbox module 210 collects the strings used by the sample app to make the activity name comparison, and uses the collected strings to identify the target app. The sandbox module 210 may compare a collected string to the app strings 213 to determine if the collected string is the name of an activity of a known app, and to the regular expressions 212 to determine if the collected string is a suspicious string. The collected strings and characteristics (e.g., property values) of a known app may be employed to generate a bait app, which is an app that lures a malware app to hijack. The sandbox evaluation is thereafter ended (step 253 to step 254).

The method of FIG. 4 follows the method of FIG. 3 when the sample app exhibits behavior indicative of UI hijacking. In the example of FIG. 4, the sample app is re-run in the sandbox module 210 (step 301). The behavior of the sample app is monitored in the sandbox module 210 to determine whether or not the sample app is making foreground activity name comparisons that target the sample itself, i.e., looks for its own activity name in the foreground activity (step 302). This advantageously allows for detection of malware apps, such as ransomware apps, that persist in making its activity the foreground activity, thereby preventing the user from operating the mobile computing device. When the sample app is making foreground activity name comparisons that target itself, the sandbox module 210 switches a system app activity to the foreground (step 302 to step 309). The system app activity is an activity of an app that is part of the mobile operating system. The sandbox module 210 waits for a few seconds after switching the system app to run in the foreground. When, after switching the system app to run in the foreground (step 309 to step 306), the sample app is detected to be the foreground app (step 306 to step 308), the sample app is deemed to be a malware app (step 308).

When the sample app is not making foreground activity name comparisons that target itself, a bait app is generated using strings used by the sample app to make foreground activity name comparisons (step 302 to step 303). The strings used by the sample app to make foreground activity name comparisons may be collected in a current or previous monitoring of the sample app (e.g., see FIG. 3, step 252). The bait app is so-named because it is configured as a bait for a malware app to hijack. The bait app may have the activity name and known property values of the target app. The bait app is switched to run as the foreground app (step 304). After switching the bait app to run in the foreground, the sandbox module 210 may wait a few seconds (step 305) to give the sample app some time to start hijacking the activity of the bait app. When the sample app instead of the bait app is detected to be the foreground app, the sample app is deemed to be a malware app (step 306 to step 308). Otherwise, when the sample app is not the foreground app, the sample app is deemed to be normal, i.e., not malware (step 306 to step 307).

Figure 5:
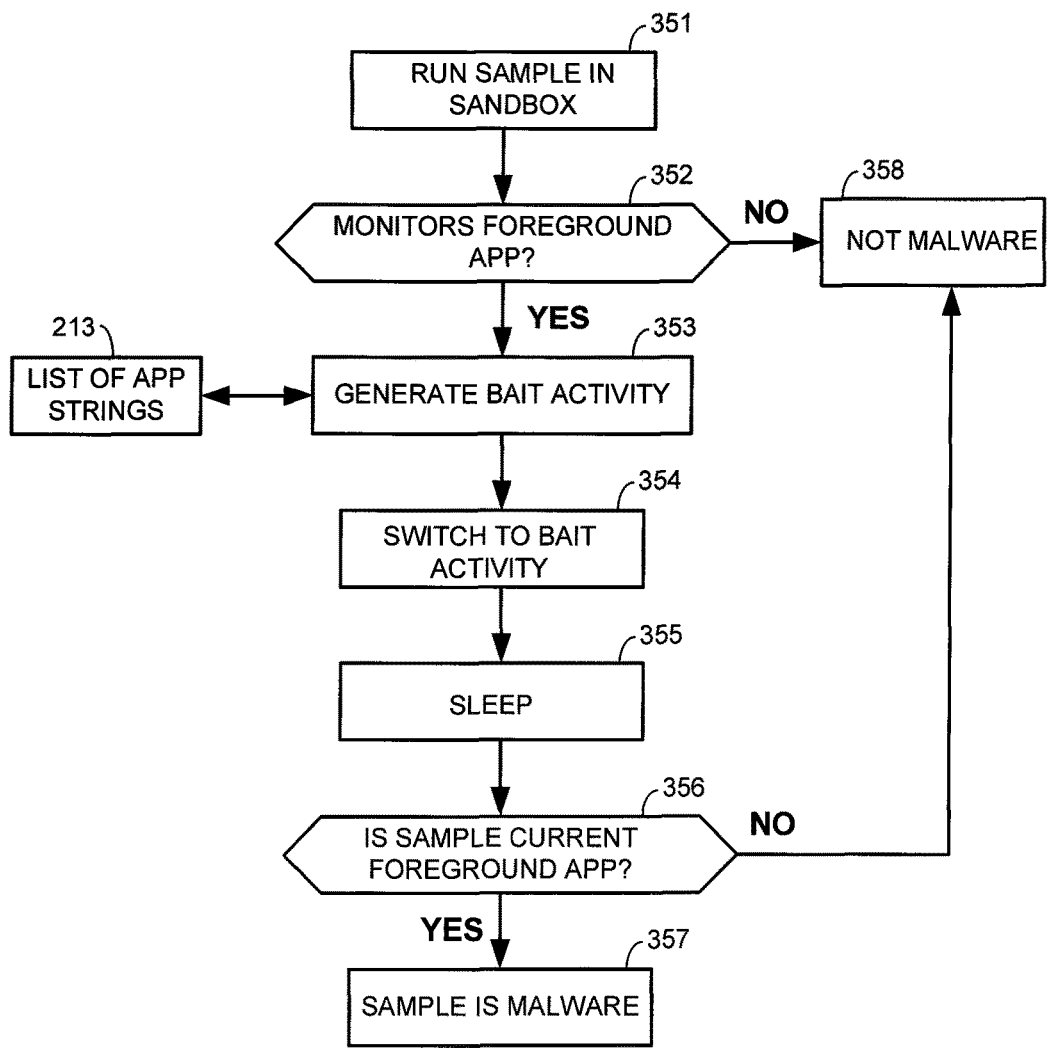
FIG. 5 shows a flow diagram of a computer-implemented method of detecting malware apps in accordance with an embodiment of the present invention.

FIG. 5 shows a flow diagram of a computer-implemented method of detecting malware apps in accordance with an embodiment of the present invention. The method of FIG. 5 is a streamlined version of the methods of FIGS. 3 and 4, and may be more suitable in endpoint computing devices, e.g., customer computers instead of backend server computers of computer security vendors.

In the example of FIG. 5, a sample app is executed in the sandbox module 210 (step 351) to detect whether or not the sample app exhibits behavior indicative of UI hijacking. More specifically, the sample app may be monitored to detect whether or not the sample app monitors the foreground app (step 352). If the sample app is not monitoring the foreground app, the sample app is not deemed to exhibit UI hijacking behavior, in which case the sample app is not deemed to be a malware app (step 352 to step 358). A bait app is generated when the sample app is detected to be monitoring the foreground app (step 352 to step 353). The bait app may be generated using strings used by the sample app to make foreground activity name comparisons to detect the foreground app. Strings collected from the sample app may be compared to app strings 213 to identify the app being targeted by the sample app. The bait app may have the activity name and property values of the target app. The bait app is switched to run in the foreground (step 354) to lure the sample app to hijack the activity of the bait app. After switching the bait app to the foreground, the sandbox module 210 may wait a few seconds (step 355) to give the sample app some time to start hijacking the activity of the bait app. When the sample app instead of the bait app is detected to be the foreground app, the sample app is deemed to be a malware app (step 356 to step 357). Otherwise, when the sample app is not the foreground app, the sample app is deemed to be normal, i.e., not malware (step 356 to step 358).

Methods and systems for detecting malware apps have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of detecting malware apps that hijack app user interfaces, the method comprising:
receiving a sample app of a mobile operating system;
running the sample app in an emulator of the mobile operating system;
monitoring behavior of the sample app in the emulator to collect a string that the sample app uses to detect whether or not a target app is currently running in a foreground of the emulator, wherein the collected string is a string employed by the sample app to detect a name of an activity of the target app;
generating a bait app configured as bait for a malware app to hijack using the collected string, wherein an activity of the bait app has the same name of the activity of the target app;
switching the bait app to run in the foreground; and
in response to switching the bait app to run in the foreground, deeming the sample app to be a malware app when the sample app instead of the bait app is running in the foreground.

2. The method of claim 1, further comprising:
when the sample app is found to be detecting whether or not the sample app itself is running in the foreground, running a particular app in the foreground; and
deeming the sample app to be the malware app when the sample app instead of the particular app is running in the foreground.

3. The method of claim 2, wherein the particular app is an app of the emulator of the mobile operating system.

4. The method of claim 1, wherein the emulator comprises a sandbox.

5. The method of claim 1, further comprising:
comparing the collected string to strings of activity names of known apps.

6. The method of claim 1, wherein the sample app is received from a mobile computing device over a computer network.

7. The method of claim 1, wherein the sample app is received from a smartphone.

8. A computer system for detecting malware apps that hijack app user interfaces, the computer system comprising a memory and a processor, the memory including instructions that when executed by the processor perform the steps of:
receiving a sample app of a mobile operating system;
running the sample app in an emulator of the mobile operating system;
monitoring behavior of the sample app in the emulator to collect a string that the sample app uses to detect whether or not a target app is currently running in a foreground of the emulator, wherein the collected string is a string employed by the sample app to detect a name of an activity of the target app;
generating a bait app configured as bait for a malware app to hijack using the collected string, wherein an activity of the bait app has the same name of the activity of the target app;
switching the bait app to run in the foreground; and
in response to switching the bait app to run in the foreground, deeming the sample app to be a malware app when the sample app instead of the bait app is running in the foreground.

9. The computer system of claim 8, wherein the instructions further perform the steps of:
when the sample app is detected to be determining whether or not the sample app itself is running in the foreground, running a particular app in the foreground; and
deeming the sample app to be the malware app when the sample app instead of the particular app is running in the foreground.

10. The computer system of claim 9, wherein the particular app is an app of the emulator of the mobile operating system.

11. The computer system of claim 8, wherein the emulator comprises a sandbox.

12. The computer system of claim 8, wherein the instructions further perform the steps of:
comparing the collected string to strings of activity names of known apps.

13. A computer-implemented method of detecting malware apps that hijack app user interfaces, the method comprising:
receiving a sample app of a mobile operating system;
running the sample app in a sandbox that emulates the mobile operating system;
monitoring a behavior of the sample app in the sandbox to collect a string that the sample app uses to detect whether or not a target app is currently running in a foreground of the emulated mobile operating system, wherein the collected string is a string employed by the sample app to detect a name of an activity of the target app;

generating a bait app configured as bait for a malware app to hijack using the collected string, wherein an activity of the bait app has the same name of the activity of the target app;

switching the bait app to run in the foreground; and in response to switching the bait app to run in the foreground, deeming the sample app to be a malware app when the sample app instead of the bait app is running in the foreground.

14. The method of claim 13, further comprising:

generating the bait app using a string employed by the sample app to make string comparisons to detect whether or not the target app is currently running in the foreground.

\* \* \* \* \*